David D. Kilpatrick
INVENTOR.

BY Harvey A. David
John M. Pease
ATTORNEYS

's Patent Office 3,435,452
Patented Mar. 25, 1969

1

3,435,452
SURROGATE VIEWING SYSTEM
David D. Kilpatrick, Falls Church, Va., assignor to the United States of America as represented by the Secretary of the Navy
Filed Aug. 25, 1967, Ser. No. 663,450
Int. Cl. H04b 13/00
U.S. Cl. 343—6          2 Claims

ABSTRACT OF THE DISCLOSURE

A surrogate viewing system for presenting a reconstructed visible wave front view of portions of a real world field of view for use in control of vehicles. The system comprises a display computer for combining range and attitude data of the vehicle and the real world objects and a holographic projector and storage apparatus responsive to the computer to project reconstructed wave front images corresponding to the real world object or field of view for which surrogate viewing is desired.

The invention described herein may be manufactured and used by or for the Government of the United States of America for governmental purposes without the payment of any royalties thereon or therefor.

Background of the invention

Various systems have been provided or proposed heretofore for providing visual information to the operator of a vehicle, e.g., an airplane pilot, to assist him in piloting, weapon pointing or navigation. One example of such a system is found in "contact analog viewing" of a synthetically generated picture, as by television or the like, which presents a view to the vehicle operator or pilot which is as nearly analogous to the contact flight scene as possible so that the pilot may control his craft as if he were actually viewing the real world scene and maintaining contact flight. This concept has been limited in success by limited capabilities to generate picture content, television format presentation, etc.

As another example, the "head up display" (HUD) concept represents an effort to present visual vehicle control information which the pilot could view while at the same time continuing to view a normal real world scene through the cockpit windshield to maintain contact flight in a normal manner. In the HUD the informational image is projected from a cathode ray tube or other essentially flat projector face and collimated and reflected by a dichroic mirror for viewing at the level of the aircraft windshield and while looking through the windshield. The particular advantages of the HUD, which has included perspective type formats to give apparent depth to the images, include the possibility of simultaneous viewing of real world and coded information, and the superpositioning thereof to aid in visual search, recognition, navigation, weapons pointing, and the like. The HUD system, however, is limited by the limited capabilities of generating realistic images through existing television type display techniques.

In addition to the foregoing, the development of the art of holography now permits wave front reconstruction of a visible field which, to the eye, is indistinguishable from the original wave front.

Summary of the invention

With the foregoing in mind, it is a primary object of the present invention to provide a surrogate viewing system which overcomes certain of the limitations of the prior contact analog viewing systems and of the HUD systems through the use of holographic techniques for reconstructing an image which may be viewed by the pilot while also viewing a real world scene, if visible, through the aircraft windshield without the need of television picture generation.

Another object of the invention is the provision, in a vehicle such as an airplane, of a surrogate viewing system which, through the use of known holographic techniques, provides for the wave front reconstruction of a visible field of view or image, in combination with means for controlling the formation of the image so as to provide visual information by which the vehicle operator or pilot may steer the vehicle, for example in making of low visibility landing approaches.

Yet another object of the invention is the provision of a surrogate viewing system of the foregoing character wherein synthetic objects may be inserted in the field of view and may include apparent "glide slopes" of wire, flat sheets or the like, or "entry gates" portrayed as rectangles or ovals through which the aircraft must appear to fly to execute a proper approach.

Description of the preferred embodiment

The invention will be described hereinafter with reference to use as an aid to an aircraft pilot in making aircraft carrier landing approaches, although it will be understood that such use is exemplary only and that surrogate viewing systems embodying the invention may also be used in navigation, search, weapons pointing, and other similar applications.

Figures 1, 3:
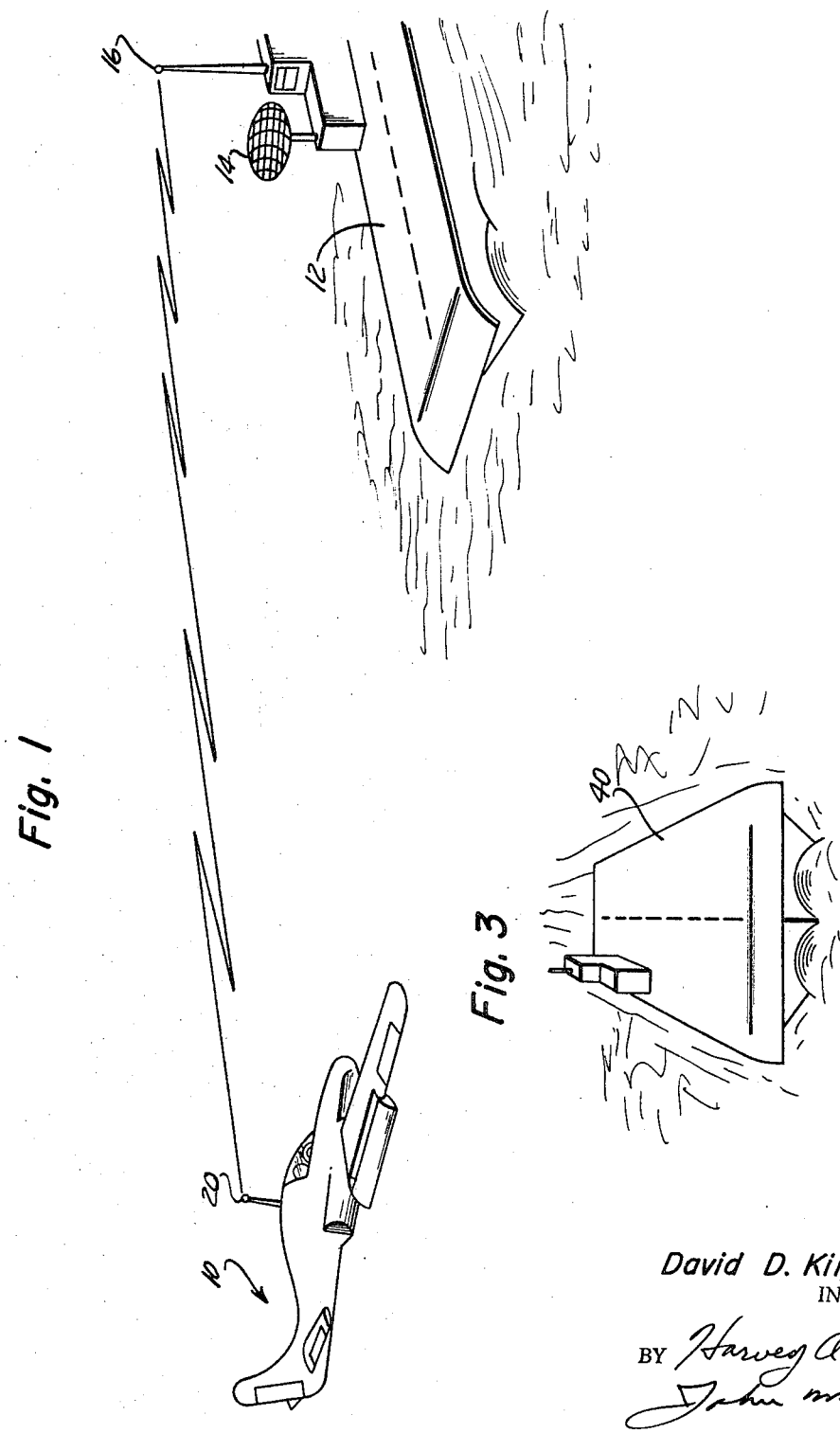
FIG. 1 is an illustration of an aircraft making an aircraft carrier landing approach and utilizing the surrogate viewing system embodying the present invention.
FIG. 3 is an illustration of the pilot's view of a reconstructed wave front image corresponding to a real world object, e.g., the aircraft carrier of FIG. 1.

Referring to FIG. 1, there is illustrated an aircraft 10 employing the surrogate viewing system of this invention in making a landing approach to an aircraft carrier 12 particularly under conditions of restricted visibility such as in the presence of fog or the like. The aircraft carrier 12 is equipped with radar including a directional antenna 14, which scans the zone of aircraft approach and determines its range and bearing, as the aircraft approaches.

The carrier 12 is further equipped with radio transmitting equipment including a transmitting antenna 16 for radioing the range and bearing data, as well as ship's compass heading, to the aircraft 10. The latter carries radio receiving equipment 18 (FIG. 2) including an antenna 20 for receiving such data.

The range and bearing, and ship's heading data received by radio receiving equipment 18 is applied as an input to a display computer 24 via suitable conductor means represented as a flow line 26. Altitude and aircraft attitude data are supplied to the display computer 24 via lines 30 and 32 from the altimeter 34 and aircraft attitude sensing means (e.g., pitch, roll, heading sensors) indicated collectively at 36. The display computer 24 combines the range, bearing, carrier heading, aircraft altitude and attitude data to provide on line 38 an output signal which corresponds to the attitude of the aircraft carrier 12 to the aircraft 10. That is to say, the way the aircraft carrier 12 would appear to the pilot P when viewed through the aircraft windscreen if it were not for darkness, the presence of fog, or the like.

The output of the display computer 24 on line 38 is applied to a holographic projector 42 mounted in the aircraft and adapted to project an image I in the form of a reconstructed wave front in the path of vision of the pilot P as he peers through the wind-screen in search of the carrier 12 he is approaching.

Figure 2:
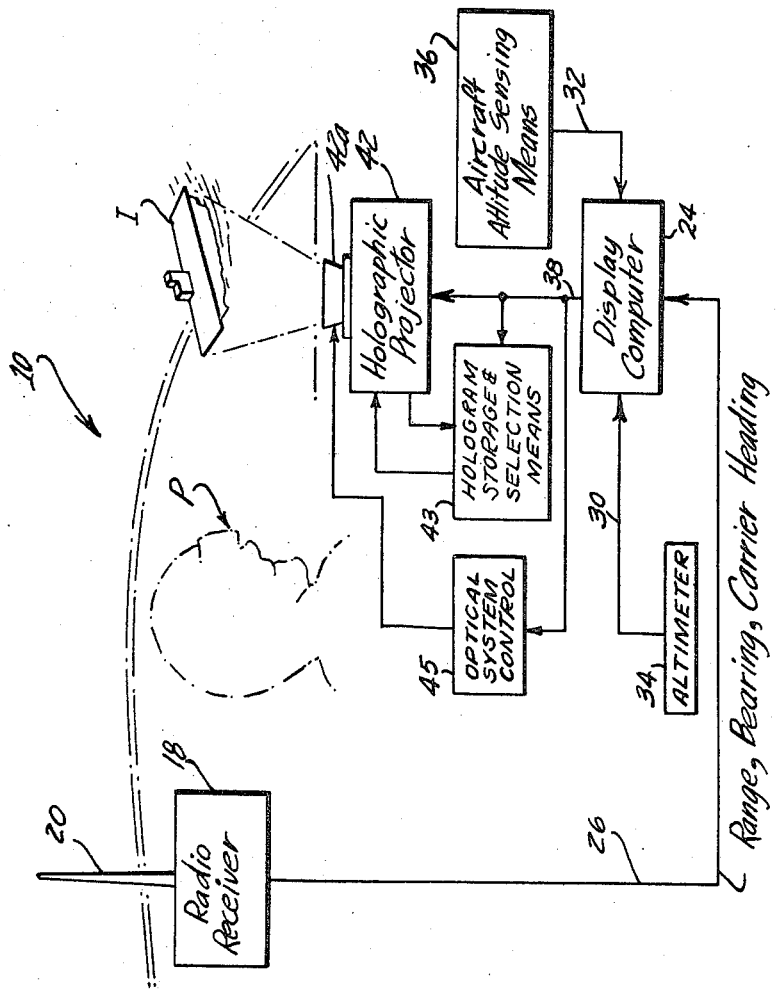
FIG. 2 is a diagrammatic view of the surrogate viewing system of this invention.

The holographic projector 42 comprises a bank of holograms made from aircraft carriers or models thereof and is responsive to the display computer output on line 38 to select and project a hologram to provide a reconstructed wavefront image I which will appear to the pilot as if he were actually viewing the carrier 12, the storage and selection means being represented by block 43 in FIG. 2.

As the pilot makes his approach, the projector 42 responds to changing output signals from the display computer to update the reconstructed wave front image I as necessary to make it correspond in appearance and attitude to that of the actual carrier 12. In addition to changing the holograms exposed to the projector's aperture, through any of the well known automatic selection devices, the projector comprises a variable optical system 42a, which may be actuated in the nature of a zoom lens by the optical system control 45 of FIG. 2, to provide a smooth and realistically changing image. The resultant surrogate view will enable a pilot to make carrier approaches and landings under conditions of zero actual visibility.

In addition to utilizing holograms from which images of the carrier 12 are reconstructed, synthetic objects such as "glide slopes" of wire, flat sheets, or the like can be inserted into the surrogate view. Similarly, "entry gates" portrayed as rectangles or ovals through which the aircraft must fly could be projected into the pilot's view.

While the invention has been described with reference to use in an aircraft for making aircraft carrier approaches, it will be understood that such use is given only as an example and that the surrogate viewing system of this invention may be utilized to advantage in the control of other vehicles and that the operator or pilot may be in the vehicle as in the example given, or he may be elsewhere and utilizing the surrogate viewing system as a remote control aid.

Accordingly, many modifications and variations of the present invention are possible in the light of the above teachings. It is therefore to be understood that within the scope of the appended claims the invention may be practiced otherwise than as specifically described.

What is claimed is:
1. A surrogate viewing system for providing to the pilot of an aircraft a viewable reconstructed wavefront image corresponding to a real world object such as an aircraft carrier having associated therewith radio means for transmitting aircraft range data, aircraft bearing data, and object heading data, said viewing system comprising:
   radio receiver means (18) for receiving said range, bearing, and heading data;
   altimeter means (34) in said aircraft for providing altitude data;
   attitude sensing means (36) in said aircraft for providing aircraft attitude data;
   a display computer (24) connected to said radio receiver means, said altimeter means, and said attitude sensing means and operative to combine said range data, bearing data, heading data, altitude data, and attitude data to provide output signals corresponding to the relative positions of said aircraft and said object;
   holographic projection means (42, 43) connected to said display computer and comprising storage and selection means for a plurality of holograms each representative of predetermined relative positions of said aircraft and object;
   said holographic projection means being responsive to said output signals of said display computer to successively select and project said holograms so as to periodically update said reconstructed wavefront image as said aircraft and object change in relative positions.

2. A surrogate viewing system as defined in claim 1 and wherein:
   said projection means comprises variable optical means responsive to said output signals to progressively modify said image in accordance with changes of said aircraft position with respect to said object.

References Cited

UNITED STATES PATENTS

| | | | |
|---|---|---|---|
| 2,770,166 | 11/1956 | Gabor | 88—14 X |
| 2,959,779 | 11/1960 | Miller et al. | 343—6 |
| 3,136,999 | 6/1964 | Schreffler. | |
| 3,230,819 | 1/1966 | Noxon | 343—108 |
| 3,237,194 | 2/1966 | Curry et al. | 343—108 |
| 3,284,799 | 11/1966 | Ross | 343—6 |

RICHARD A. FARLEY, *Primary Examiner.*

MALCOLM F. HUBLER, *Assistant Examiner.*

U.S. Cl. X.R.

343—108